US007930481B1

(12) United States Patent
Nagler et al.

(10) Patent No.: US 7,930,481 B1
(45) Date of Patent: Apr. 19, 2011

(54) CONTROLLING CACHED WRITE OPERATIONS TO STORAGE ARRAYS

(75) Inventors: Jim Nagler, Los Gatos, CA (US); Ramesh Balan, Cupertino, CA (US)

(73) Assignee: Symantec Operating Corporation, Mountain View, CA (US)

( * ) Notice: Subject to any disclaimer, the term of this patent is extended or adjusted under 35 U.S.C. 154(b) by 438 days.

(21) Appl. No.: 11/642,005

(22) Filed: Dec. 18, 2006

(51) Int. Cl.
*G06F 12/00* (2006.01)
(52) U.S. Cl. ........ 711/118; 711/113; 711/154; 711/170; 710/18; 710/29; 710/52; 710/57; 710/60
(58) Field of Classification Search .................... 711/118
See application file for complete search history.

(56) References Cited

U.S. PATENT DOCUMENTS

| | | | |
|---|---|---|---|
| 5,566,315 A | 10/1996 | Milillo et al. | |
| 5,862,409 A * | 1/1999 | Yoshimoto et al. | 710/57 |
| 5,926,834 A | 7/1999 | Carlson et al. | |
| 6,330,642 B1 | 12/2001 | Carteau | |
| 6,442,706 B1 * | 8/2002 | Wahl et al. | 714/6 |
| 6,640,281 B2 * | 10/2003 | Obara et al. | 711/114 |
| 6,687,765 B2 | 2/2004 | Surugucchi et al. | |
| 7,127,568 B2 | 10/2006 | Watanabe et al. | |
| 7,171,522 B2 * | 1/2007 | Watanabe et al. | 711/144 |
| 7,430,637 B2 * | 9/2008 | Mikami | 711/118 |
| 7,434,011 B2 * | 10/2008 | Shue | 711/156 |
| 2002/0147888 A1 * | 10/2002 | Trevathan | 711/133 |
| 2004/0117441 A1 * | 6/2004 | Liu et al. | 709/203 |
| 2004/0117585 A1 | 6/2004 | Glider | |
| 2004/0148484 A1 * | 7/2004 | Watanabe et al. | 711/170 |
| 2005/0114592 A1 | 5/2005 | Jin | |
| 2006/0015688 A1 | 1/2006 | Schnapp | |
| 2006/0041731 A1 | 2/2006 | Jochemsen | |
| 2006/0161700 A1 | 7/2006 | Boyd | |
| 2006/0236033 A1 * | 10/2006 | Guinn et al. | 711/118 |
| 2006/0277384 A1 * | 12/2006 | Yagawa et al. | 711/170 |
| 2007/0124542 A1 | 5/2007 | Ven | |
| 2008/0005614 A1 | 1/2008 | Lubbers | |

OTHER PUBLICATIONS

B. Forney, A. C. Arpaci-Dusseau, and R. H. Arpaci-Dusseau. Storage-Aware Caching: Revisiting Caching for Heterogeneous Storage Systems. In The First USENIX Symposium on File and Storage Technologies (FAST '02), Monterey, CA, Jan. 2002.*
U.S. Appl. No. 11/641,340, filed Dec. 18, 2006.
Office Action of Apr. 13, 2009 in U.S. Appl. No. 11/641,340.
Response to Office Action of Apr. 13, 2009 in U.S. Appl. No. 11/641,340.
Official Action for U.S. Appl. No. 11/641,340 dated Oct. 21, 2009.
Response to Official Action for U.S. Appl. No. 11/641,340 dated Oct. 21, 2009, mailed Jan. 21, 2010.
Official Action is U.S. Appl. No. 11/641,340 issued Feb. 3, 2010, 18 pages.

(Continued)

*Primary Examiner* — Kevin L Ellis
*Assistant Examiner* — Kalpit Parikh
(74) *Attorney, Agent, or Firm* — Meyertons, Hood, Kivlin, Kowert & Goetzel, P.C.

(57) ABSTRACT

An application may issue write operations intended for a SAN via a server cache. Monitoring of the SAN (e.g., the autonomous persistent cache of the storage arrays of the SAN), allows caching performance to be controlled by a write caching policy. The server cache memory may be increased, decreased or eliminated according to the write caching policy. In one embodiment, a storage volume manager may adjust the latency of write operations in the server cache. In some embodiments, the write caching policy may adapt and learn characteristics of the storage environment, which may include calibrated values for messaging timestamps.

18 Claims, 6 Drawing Sheets

OTHER PUBLICATIONS

Response to Official Action in U.S. Appl. No. 11/641,340 issued Feb. 3, 2010, filed May 4, 2010, 12 pages.

Official Action in U.S. Appl. No. 11/641,340 issued Jul. 22, 2010, 16 pages.

* cited by examiner

CONTROLLING CACHED WRITE OPERATIONS TO STORAGE ARRAYS

BACKGROUND OF THE INVENTION

1. Field of the Invention

This invention relates to distributed storage environments in general and, more particularly, to a method and apparatus for controlling cached write operations to storage arrays.

2. Description of the Related Art

Modern distributed shared storage environments may include multiple storage objects shared via one or more interconnection networks. The interconnection networks provide the infrastructure for accessing the various elements of a distributed shared storage environment. Within the storage environment, file system abstractions may be built on top of multiple storage objects. Additional software layers may provide for the creation and management of logical volumes on storage objects within the context of a storage file system. The distribution and sharing system for the storage objects may be referred to as a storage area network (SAN), which may include its own networking fabric and management systems.

The storage objects in a SAN may be physical disks assembled into storage arrays and may be configured to distribute data across multiple storage devices. Storage arrays may further be equipped with a persistent cache, which can treat a write operation as being completed when the data associated with the write operation (intended to be written to the storage array) has been written to the cache. The persistent cache may then independently flush the write operation to the storage array. By reducing the latency of the write operation at the storage array, the persistent cache may provide for increased overall performance (i.e., data throughput).

Furthermore, additional caches or buffers may additionally be installed at multiple points in the storage environment between an application issuing write operations and the target physical storage arrays. For example, a server that includes the application issuing the write command may also include a server cache that can be configured for buffering write operations (e.g., within the file system layer).

When each of the multiple caches (or buffers) in a distributed storage environment are neither synchronized nor coordinated, such a configuration may result in a stochastic distribution of write operations between the caches, such that the overall data throughput may be poorly distributed in time or in the available memory capacity. Thus, a string of independent buffers or caches may not necessarily represent an efficient method of load balancing among the various components in the storage environment. For example, a flood of write operations at a particular moment could cause bottlenecks and even seizures (i.e., a storage array shutting down and not accepting any further I/O operations for a period of time), despite the fact that the storage system could have theoretically provided enough overall bandwidth to handle the load.

SUMMARY

Various embodiments of a system in which an application issues write operations to a storage area network (SAN) via a server cache are disclosed. In the system, a computer-implemented method for controlling write operations sent to a SAN is disclosed. In one embodiment, the method comprises receiving information regarding write operations performed within said SAN. The method further includes determining whether said received information is indicative of a violation of a write caching policy, and, if so, taking one or more actions specified by said write caching policy, wherein said one or more actions include altering one or more parameters associated with the server cache.

The violation of the write caching policy may be based on a current state of said system. The violation may further be based on a potential future state of said system. In one embodiment, said one or more actions includes deactivating write buffering by the server cache. In another embodiment, said one or more actions includes increasing the buffering latency of subsequent write operations forwarded to the SAN from the server cache. In yet another embodiment, said altering said one or more parameters associated with the server cache includes allocating additional memory for buffering write operations. The violation of the write caching policy may be indicative of a seizure in the SAN. A violation of the write caching policy may be indicative of a seizure in the SAN. The write caching policy may be configured according to the storage requirements of the application.

In various embodiments, the information regarding write operations may include information regarding the memory usage of one or more persistent caches within the SAN. The method may further include adapting the write caching policy. The method may still further include assessing the scope of the violation.

In yet a further embodiment, the method may further include initiating a write calibration scenario, wherein a set of reference write operations are issued to the SAN; recording a plurality of timestamps associated with messages sent to or received by the SAN during the write calibration scenario; calculating one or more write calibration values by performing a statistical analysis of the plurality of timestamps; and including the one or more write calibration values with the write caching policy.

The SAN may include one or more different types of storage arrays. The system may further include said SAN.

Other embodiments are also disclosed, such as a computer system comprising a cache; a processor; and a memory storing program instructions executable by the processor to perform the methods described herein. The system may further include program instructions executable by the processor to execute an application configured to issue write operations to said SAN, wherein said write operations issued by said application are forwarded to said SAN via said cache.

Another embodiment is represented by a computer readable medium including program instructions executable to control write operations according to the methods described herein.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Figure 1A:
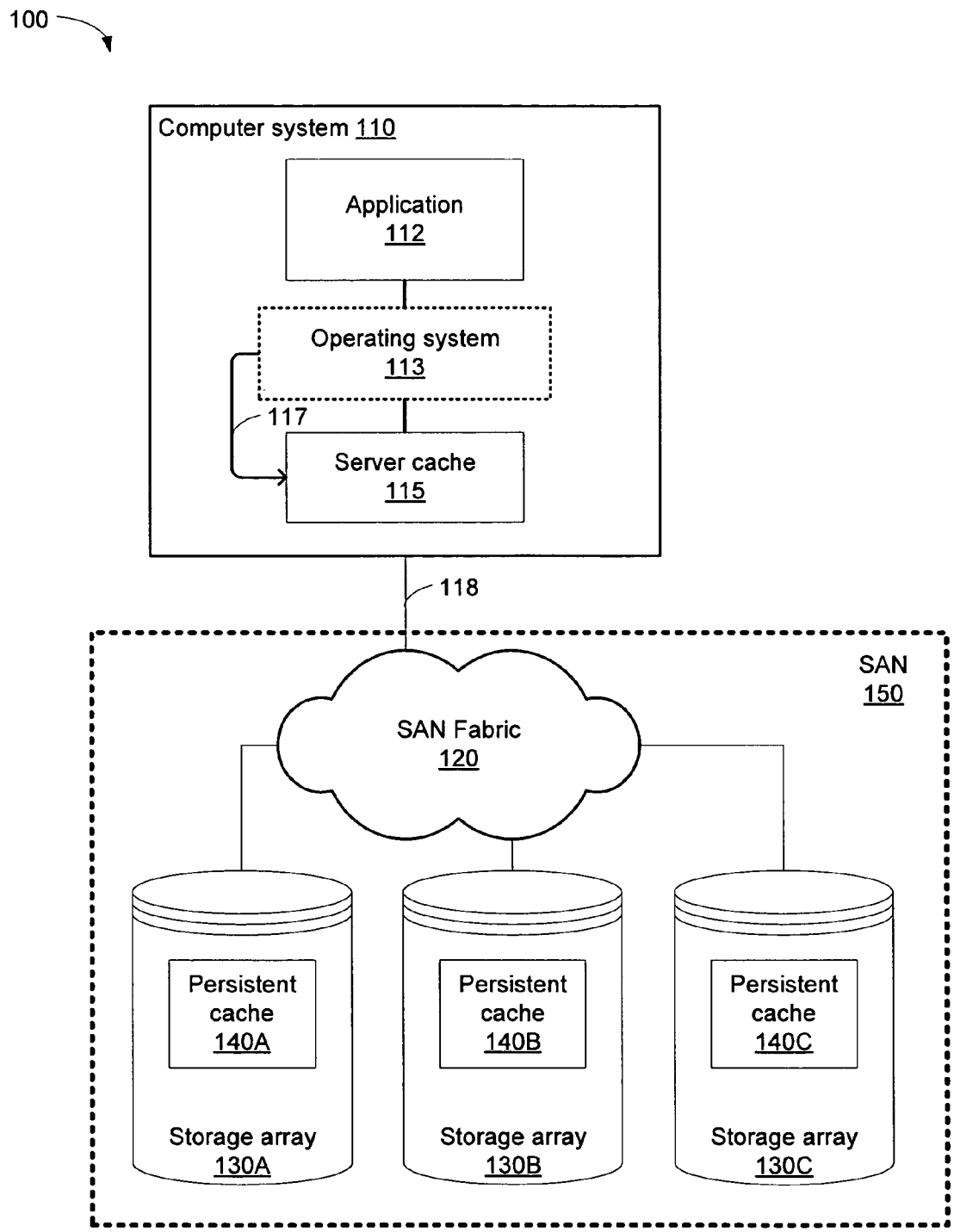
FIG. 1A is a block diagram illustrating one embodiment of a SAN environment.

Turning now to FIG. 1A, a block diagram illustrates one embodiment of a system 100 including a computer system 110 and a storage area network (SAN) 150. In one embodiment, system 100 is an enterprise data center that provides access to applications including storage to a number of client systems (not shown in FIG. 1A). Computer system 110 is connected to storage system 150 via interface 118.

In the embodiment shown in FIG. 1A, computer system 110 includes an application 112 that issues write operations for storing write data. Thus, application 112 is a source of write operations intended for SAN 150. In system 100, write operations (including associated data) issued by application 112 are forwarded to an operating system 113 of computer system 110. Operating system 113 receives the write operation and translates the incoming address of the write operation into an outgoing address that is in a format recognized by SAN 150. The write operation (i.e., the write data and the outgoing address provided by operating system 113) is then forwarded to a server cache 115. In one embodiment, operating system 113 then controls when this (and other) write operations in server cache 115 are forwarded to SAN 150 via interface 118. This control is represented in the embodiment of FIG. 1 by the arrow 117 shown from operating system 113 to server cache 115.

In some embodiments, computer system 110 is a "server." A server provides network services, such as access to applications, storage, or other computers, to one or more connected network clients. In some embodiments, computer system 110 represents a collection of servers that form a cluster, a domain, or a collection of domains that pool their resources and share access to services and resources.

Application 112 can be any application that issues write requests. For example, application 112 is configured to provide services to a large number of client systems (not shown in FIG. 1). In one embodiment, application 112 is a relational database management system.

As noted above, operating system 113 receives write operations from application 112 and forwards these write operations to server cache 115. Operating system 113 (including its associated storage management resources) may be configured in many different ways and may perform many different types of address translation on incoming addresses of write operations. For example, if an incoming write address is a block address (i.e., the application is addressing SAN 150 directly), then operating system 113 does not need to alter the incoming write address. Thus, in such an embodiment, the outgoing address is the same as the incoming address. In some embodiments, operating system 113 includes a file system and a volume manager. In these embodiments, operating system 113 provides the incoming write address (which may be in the form of a file path, for example) to the file system and volume manager, which generate the outgoing write address.

Server cache 115 is memory that is allocated by operating system 113. In many embodiments, this allocated memory is volatile memory. As shown in the embodiment of FIG. 1, server cache 115 receives write operations from operating system SAN 150 via interface 118. As described in detail below, the control provided by, for example, operating system 113 allows for dynamically changing parameters of server cache 115 (e.g., latency, size) in order to regulate when write operations are sent to SAN 150.

Interface 118 connects computer system 110 and SAN 150. Interface 118 may be realized by various logical and physical connections, such as a direct network connection, a network fabric, or a digital bus. Interface 118 may be embodied by different kinds of physical media, including metallic wire, optical fiber, or wireless signals. Interface 118 is compatible with SAN 150. Some examples of interface 118 include Ethernet, Fibre Channel, SCSI, Serial ATA, IDE, IEEE 1394, InfiniBand, USB, IEEE 802, etc. Interface 118 may be bidirectional.

SAN 150 is the target storage environment for the write operations issued by application 112 on computer system 110. The SAN may be configured to provide storage to a plurality of file systems and volumes. These file systems and volumes may be accessible by various entities, users, hosts, or services in an enterprise network (not shown in FIG. 1A). A SAN Fabric 120 may include the physical and logical networking infrastructure for providing the distributed, shared storage of the SAN 150, and may variously include networking components (switches, routers, hubs, etc.), network mediums (cables, wireless links, etc.), SAN management servers, and internetworking components (gateways, access points, etc.).

The physical storage objects accessible by the SAN Fabric 120 may include a series of storage arrays 130. It is noted that the storage arrays 130 may be collocated in an assembly, or individually dispersed at various locations. It is further noted that storage arrays 130 may be variously configured (with respect to capacity, logical and physical interfaces, controller logic, etc.) and may include physical components from a variety of sources and manufacturers. In one embodiment, a storage array is configured as a RAID, comprising one or multiple physical disk drives, depending on the RAID configuration. Some storage arrays may include an embedded host controller (not shown in FIG. 1A) with an interface to the SAN Fabric 120. The embedded host controller may additionally include a persistent cache memory 140 associated with the storage array. In FIG. 1, three individual storage arrays 130A-C are depicted with their respective persistent cache memories 140A-C for buffering I/O to the storage array, and are collectively referred to as 130 and 140, respectively.

Storage arrays within SAN 150 should ideally operate such that they do not receive too many or too few write requests at a time. Instead, the "load" for the SAN 150 should be balanced. However, when arrays 130 within SAN 150 operate independently from computer system 110, load imbalances may result. For example, if the server cache 115 becomes overloaded such that the applicable criteria for "ageing" or "flushing" items in the cache are unable to prevent an overflow, the SAN 150 may experience a "seizure" (the inability to accept additional I/O requests) as a result of the rapid flushing of server cache 115. Seizures are a cause of undesired down time for critical storage systems and for the entire network and computing infrastructure dependent on them. Seizures, therefore, represent substantial losses in the utilization of capital investments and critical business resources. For example, a short, simultaneous burst of numerous write operations issued from a server cache may cause a seizure, because the ageing criteria within a storage array may not dynamically (or intelligently) adapt to the sudden increase in data throughput.

A given storage array 130, along with its persistent cache memory 140, may operate independently to receive, cache, and flush write operations. Thus the storage array 130 may simply react to an arriving stream of write operations via the SAN 150, without requiring any coordination or management from an external source. It is noted that write operations may arrive from a plurality of servers or applications to a given storage array 130 via the SAN Fabric 120. That is, the SAN 150 may be configured to provide storage, including read and write operations, to a plurality of file systems and volumes, which are accessible by various entities, users, hosts, or services in an enterprise network (not shown in FIG. 1). Thus, the data stored in a given persistent cache memory 140 may fluctuate over time with little predictability.

The flow of write operations to SAN 150 may be adjusted using "write operation information" available to computer system 110. The write operation information may include any indicator about write operations that affects, or potentially could affect, the flow of write operations. Write operation information can pertain to the issuing or forwarding of write operations, the server cache or other system parameters relating to or affected by write operations. For example, write operation information may describe the current status of write operations in server cache 115. In another example, the write operation information may include the size of (i.e., amount of memory allocated to) the server cache 115. In some embodiments, the write operation information includes historical information about write operations or the server cache, or both.

The write operation information can also include information about SAN 150, including information about storage arrays 130. In one embodiment, write operation information includes a level of memory usage for a persistent cache 140 for a given storage array 130. The write operation information can also include the number of write operations pending in a persistent cache 140. The write operation information can also include operational information about a storage array 130, for example, whether or not a storage array 130 is operating normally.

A "write caching policy" may therefore be used to regulate the flow of write operations from computer system 110 to SAN 150 using write operation information. A write caching policy includes a set of one or more rules relating to the write operations from computer system 110 to SAN 150. A write caching policy also includes a corresponding action or actions to be taken in response to a "violation" of one or more of these rules. Note that an action specified by the write caching policy may be either corrective or preventive.

A write caching policy can define parameters and ranges for operating values that can be conditionally evaluated according to one or more of the rules within the policy. The use of a write caching policy can maintain a desired operational state of a system 100 by automating a coordinated response to external events. For example, the write caching policy can evaluate and regulate the level of memory usage in server cache 115. The write caching policy may also include rules based on reference values specific to a given system 100, such as calibration values (discussed in further detail below). The rules within write caching policy may further include any number of logical conditions, exceptions, and criteria which promote an optimal utilization of storage arrays 130 in storage system 150, or other resources associated with server cache 115.

In some embodiments, the write caching policy is generated and maintained on computer system 110. In other embodiments, a higher-level entity, such as an administrator, may implement a write caching policy across a plurality of servers that includes computer system 110. Still further, in other embodiments, the write caching policy is "tuned" (e.g., optimized for a given set of operating conditions and storage patterns) for the specific requirements of application 112.

Figure 1B:
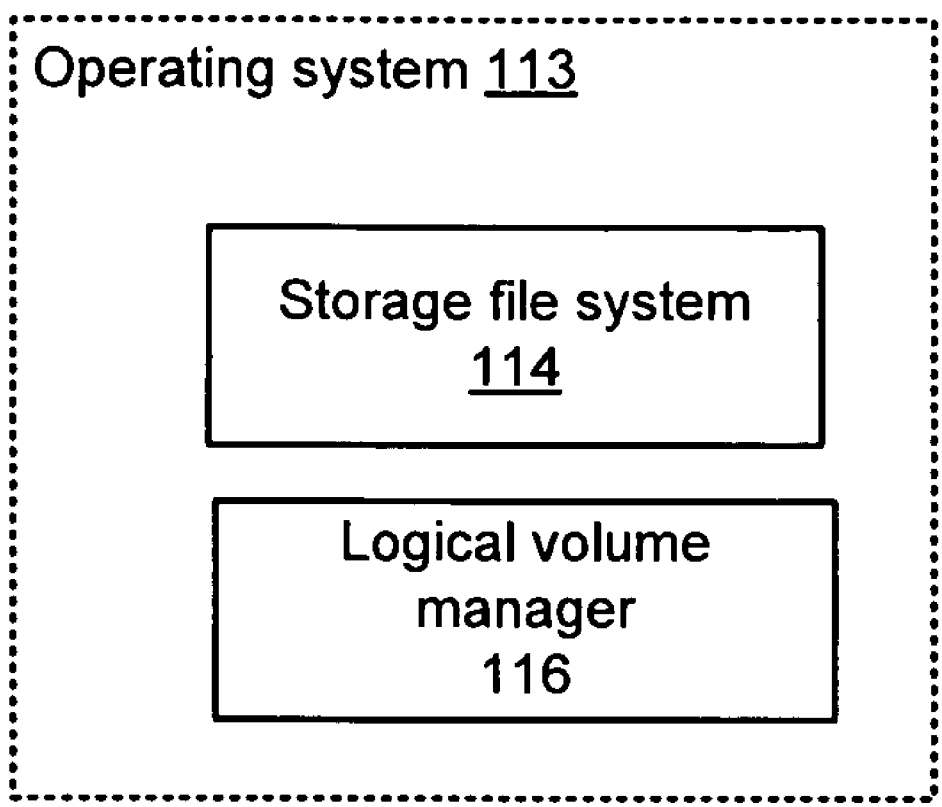
FIG. 1B is a block diagram illustrating one embodiment of storage software.

In FIG. 1B, an embodiment of an operating system configured with "storage software" is illustrated. The "storage software," which collectively refers to a storage file system 114 and a logical volume manager 116, is configured to operate with operating system 113. In one embodiment, storage file system 114 and logical volume manager 116 are each configured as kernel-mode components of operating system 113.

It is noted that different configurations of storage software can exist in various other embodiments not shown in FIGS. 1A and 1B. In some embodiments, either the logical volume manager 116 or storage file system 114 is installed on computer system 110, or on a subsystem of SAN 150. In some embodiments, the logical volume manager 116 or storage file system 114, or both, may be accessible to computer system 110 over a network connection, for example, as a remote network service. According to various embodiments described herein, computer system 110 includes both the storage file system 114 and the logical volume manager 116 for providing and managing access to SAN 150. In one embodiment, the storage file system 114 is VxFS while the logical volume manager is VxVM, both available from Veritas Corp.

In various embodiments, the write caching policy is implemented by the storage software. For example, the write caching policy may be implemented in the storage file system 114 or in the logical volume manager 116. In some examples, aspects of the write caching policy are simultaneously executed by both the storage file system 114 and the logical volume manager 116. In yet other embodiments, the write caching policy is implemented in a separate module that communicates with the storage software.

In order to implement the write caching policy, the storage software is configured to access and control certain aspects of server cache 115, thereby controlling the write operations processed by server cache 115. In one embodiment, the storage software calls API functions of operating system 113 to control server cache 115. As will be described in detail below, the storage file system 114 may control the memory associated with server cache 115. In another example, the logical volume manager 116 may control operation of server cache 115. The control of the server cache 115 by storage software is also represented by arrow 117 in FIG. 1.

As mentioned previously, server cache 115 is memory that is allocated by operating system 113 for buffering write operations, also referred to as "write buffering". In one embodiment, write buffering is controlled by an operational parameter of the storage file system 114 specifying the size of memory allocated to server cache 115. For example, the storage file system 114 may allocate or deallocate a portion of memory associated with server cache 115 in compliance with the write caching policy. In some embodiments, write buffering is controlled by logical volume manager 116, which is configured to delay (or accelerate) the processing of write operations via the server cache 115. The delay, or "latency", of write operations may be an operational parameter associated with a logical volume of SAN 150 that is configured by logical volume manager 116.

Accordingly, storage file system 114 and logical volume manager 116 are operable in some embodiments to monitor and control write operations issued from a server cache 115. According to the methods described herein, information regarding the amount and timing of data intended for writing are used to control write operations. This information may relate to application 112, server cache 115, interface 118, or SAN 150. The information may be used to implement the write caching policy that improves performance of system 100. The implementation of the write caching policy can also improve the performance of a storage array 130 by regulating the write operations send to a corresponding persistent cache 140.

Figure 2:
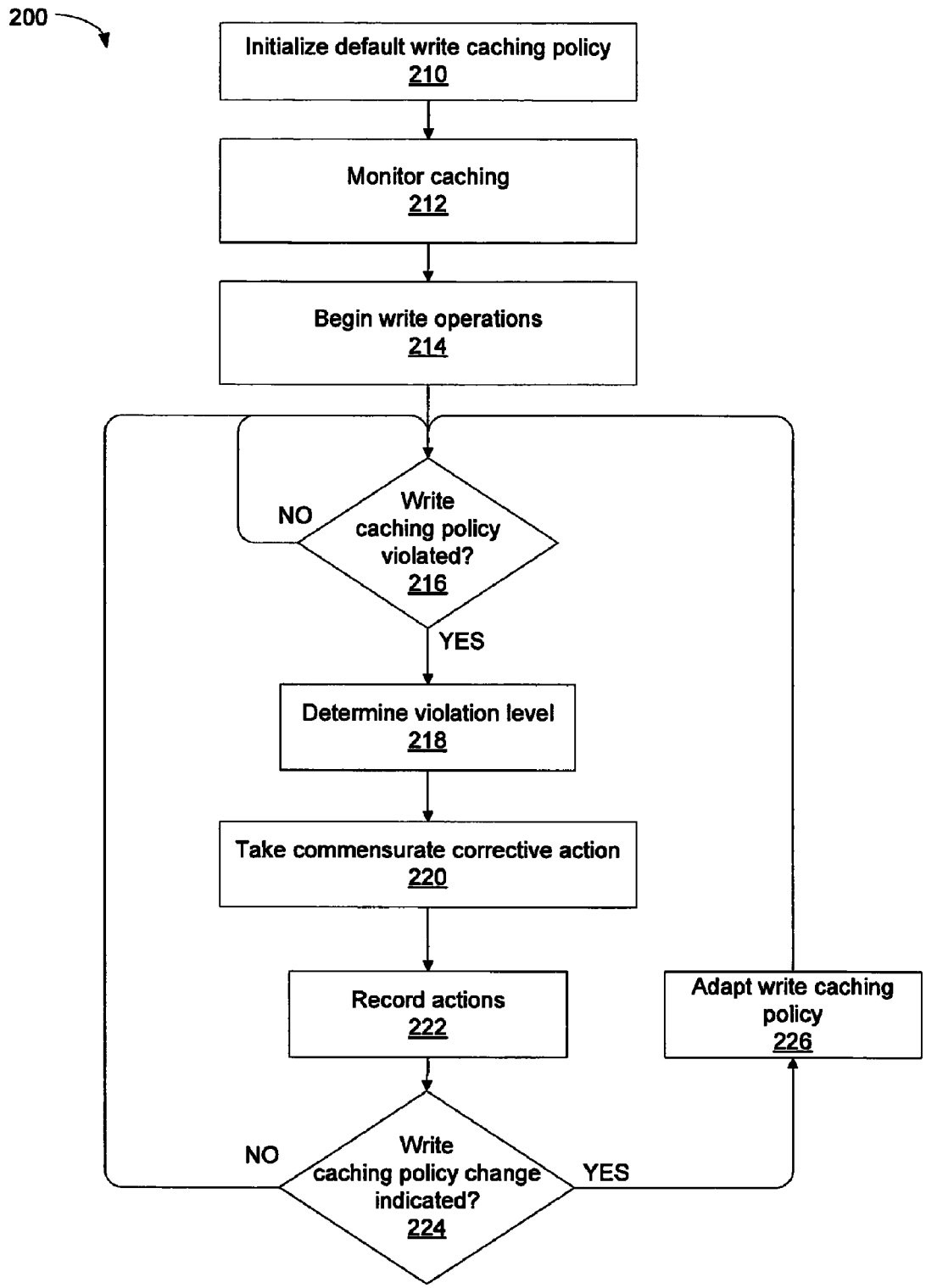
FIG. 2 is a flowchart illustrating one embodiment of a method for responding to violations of a write caching policy.

Referring to FIG. 2, a flowchart illustrating a method 200 for controlling write operations in one embodiment is illustrated. Method 200 is configured to determine if a write caching policy has been violated and (in some embodiments) determine the nature or extent of the violation. Method 200 then involves taking corrective action. It is noted that in various embodiments, method 200 may be implemented at least in part by storage file system 114 and logical volume manager 116, either singly or in combination.

In step 210, a default write caching policy is loaded for execution. In one embodiment, the default write caching policy is stored in a local storage on server 110, from where it may be loaded in step 210. Since the write caching policy may involve evaluating certain values over time (e.g., running averages), the initial loading and executing may require default values. In one embodiment, the write caching policy stores all current values at regular intervals, which may be retrieved as default values in step 210. In other embodiments, the write caching policy may store current values when server 110 is shutdown, and resume with the same values when server 110 is restarted. Other arrangements for organizing and retrieving the default values for the write caching policy may be practiced.

In step 212, the monitoring of caching activity in system 100 is started. The monitoring of caching activity may relate to either a cache in computer system 110, in SAN 150 or in both. In one embodiment, monitoring in step 212 includes polling of the "Write Pending Queue" (WPQ), which is one or more values indicating the current memory usage in persistent caches 140. The polling of the WPQ may be accomplished either on demand or continuously, for example, by messaging between server 110 and storage array 130. In one embodiment, a device-specific message is issued to poll a WPQ. In another embodiment, the WPQ may be polled using TCP/IP. Other network protocols, such as SNMP or RPC, may be used to poll WPQ in various embodiments. In one embodiment, one WPQ value is returned from each persistent cache 140 for each polling iteration.

As noted previously, storage arrays 130 may be variously configured with respect to capacity, logical and physical interfaces (e.g. Fibre Channel, SCSI, etc.), and controller logic. In one example implementation, various types of storages arrays from one or more manufacturers are accessed using array support libraries installed with the logical volume manager 116. These array support libraries may facilitate messaging between server 110 and a host controller of the storage array 130.

The WPQ values returned from polling are recorded and included with the write operation information made available to the write caching policy. In one embodiment, the write caching policy includes a determination of actions for regulating WPQ values for one or more persistent caches 140 to a given setpoint or held within a desired range. As will be discussed below, there may be several ranges or threshold categories for WPQ setpoint values.

In step 214, write operations originating on server 110 are started. As discussed above, the write operations may originate from executing application 112. Even if no write operations originate from server 110 or application 112, storage arrays 130 may exhibit WPQ activity resulting from other applications or servers that access SAN Fabric 120. However, the write operations originating on server 110 may be subject to regulation for their effect on WPQ values, as will be discussed in the remaining steps in method 200.

In step 216, a determination is made whether a write caching policy has been violated. A violation of the write caching policy could thus indicate that some unwanted behavior is occurring or that an undesired operation state has been reached. Thus, the violation may be indicative of either a current or future system state.

The write caching policy may be based on a variety of indicators, variables, states, measurements or calculations from various sources, including server 110, SAN Fabric 120, or any subcomponents thereof. The write caching policy may further include any number of logical conditions, exceptions, and criteria which promote a greater utilization of storage arrays 130. In one embodiment, a specific storage array may be configured to provide a guaranteed level of access to an application 112. The write caching policy may still further include reference values specific to the system 100, such as calibration values, as will be discussed in further detail below. In some embodiments, the write caching policy is generated and maintained on server 110. In other embodiments, a higher-level entity, such as an administrator, may implement a write caching policy across a plurality of application servers. In some embodiments, the write caching policy is enforced by storage file system 114 for a SAN volume configured by logical volume manager 116.

In step 218, the violation detected in step 216 is evaluated to determine a violation "level." For example, for a rule that evaluates the memory usage in server cache 115, this memory usage may be classified into one of the following categories:
Green—low level (0%-25%)
Yellow—moderate level (26%-75%)
Red—elevated level (76%-100%).
Depending on the current level of memory usage within server cache 115, the violation of the write caching policy may be designated (in this example) as either Green, Yellow or Red. Depending on the particular write caching policy in force, any one of these levels may represent a violation. For example, memory usage in the Green level could indicate that the server cache 115 is being underutilized. One possible action that could be taken in response to such a violation is an increase in write operations. Conversely, a server cache memory usage in the Red level could indicate that a seizure has occurred. In some embodiments, a violation level is not determined. Thus, step 218 is optional.

The violation level determined in step 218 may be related to various other aspects of the performance of the enterprise storage system. For example, the violation may be related to network performance through a given communication pathway in the SAN fabric 120. In various embodiments, the violation may also be related to the condition of the physical disks in a storage array, such as factors that affect access times or the remaining storage capacity.

In step 220, a corrective action corresponding to the detected violation level is performed. If step 218 is performed, corrective action may be performed according to the determined violation level. One type of corrective action that may be taken in step 220 is "throttling" (i.e., slowing or accelerating) of write operations. In some embodiments, the corrective action taken is a report (or a message) to a separate module that a violation has occurred, including information about the violation. The desired corrective action for a given violation may be specified by the write caching policy. In one embodiment, a list of corrective actions or procedures is defined in the write caching policy, according to the detected violation level. In another embodiment, the write caching policy specifies a location where the respective corrective action is stored and may be retrieved, for example, in a data file containing additional instructions. In still a further embodiment, the write caching policy may specify an executable program that may be loaded and executed to implement a desired corrective action.

The corrective action taken in step 220 may include a change to the write buffering controlled by storage file system 114. As mentioned previously, write buffering, or more generally I/O buffering, may be a customizable feature controlled by storage file system 114. The change in step 220 may include enabling or disabling buffering, or changing the amount of memory allocated to buffering in the server cache 115. In one example, reducing the amount of memory allocated for write buffering to zero may be used to disable write buffering. Storage file system 114 may interact with an operating system executing on computer system 110 as part of the allocation of memory for buffering.

The corrective action taken in step 220 may include a change to the latency of write operations sent to a volume. Logical volume manager 116 may provide a feature for adjusting the write latency. In one example, a 20 ms latency may be set for each write operation intended for a volume managed by logical volume manager 116, such that the write operation is delayed by this amount before being transmitted to the storage system 130. Write operations may be buffered in server cache 115 during this time. In other cases, delayed write operations may cause a delay in application 112 until the latency has expired. In some instances, write operations may be buffered in the server cache 115 and cause the issuing application 112 to be delayed. It is noted that the write latency may be increased or decreased or even be eliminated (i.e., write latency set to zero).

It is noted that the steps 216-220 may be viewed as elements of a "control loop" algorithm for generally regulating a desired operational state of system 100, or for specifically regulating a subcomponent, such as server cache 115 or storage system 130. Correspondingly, the write caching policy contains the definitions and parameters for this control loop.

In some embodiments of method 200, at least some of the events and actions taken in steps 216-220 are recorded in step 222, creating an event log. In one example, each iteration of control loop 216-220 may be recorded, or appended, to the historical log, thereby providing a baseline or other statistical input into the control loop algorithm. In this manner, a certain amount of stability may be achieved or maintained. The recording in step 222 may also provide the basis for "learning" the behavior of system 100. For example, the recorded events may reveal patterns relating to storage characteristics. In some embodiments, the write caching policy may use information in the log.

In step 224, a further determination may be made whether or not a change, or adaptation, in the write caching policy is indicated. The adaptation may result from a violation or historical events, or a combination thereof. In some embodiments of method 200, the write caching policy cannot be changed dynamically, and step 224 is not performed.

If changes to the write caching policy are possible the adaptation to the write caching policy may be performed in step 226. One example of a change to a write caching policy: if a seizure has occurred for the third time within a predetermined time period on a given storage array, the upper threshold limit of a server cache output value is reduced, thereby reducing data throughput to the array under normal operating conditions. In other words, the write caching policy is adapted in this example to reduce the load on storage system 130. Other adaptations of write caching policies are, of course, possible. The rules for adapting the write caching policy may be internally defined or externally administrated. In one embodiment, an administrator is notified each time an adaptation to the write caching policy is indicated. In an alternate embodiment, options for adapting the write caching policy may be automatically formulated and suggested to a user or administrator for approval.

After the adaptation to the write caching policy in step 226, or if no change is indicated in step 224, the method returns to step 216, from where the control loop repeats. It is noted that the polling of server cache output values in step 212 may be a continuous operation that constantly executes and provides current values for evaluation in steps 216 and 218.

Figure 3:
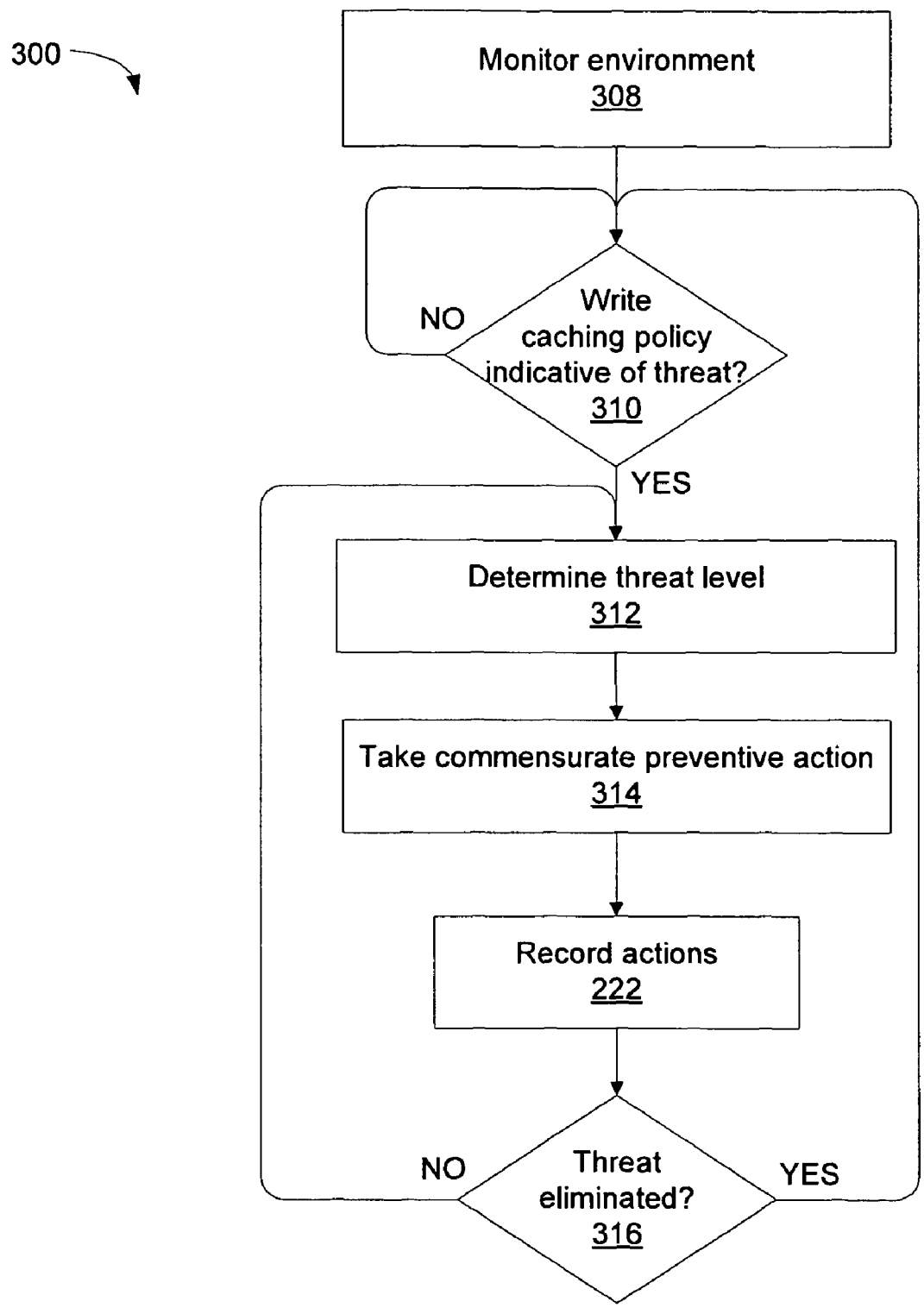
FIG. 3 is a flowchart illustrating one embodiment of a method for responding to threats to a write caching policy.

Referring to FIG. 3, a flowchart illustrating a method 300 for controlling write operations in one embodiment is illustrated. It is noted that functionality that corresponds to that of method 200 is numbered identically. Method 300 is configured to determine if a write caching policy violation exists that is indicative of a future state of the system. Method 300 then involves taking corrective action before a violation occurs once the threat has been identified. It is noted that in various embodiments, method 300 may be implemented by storage file system 114 and logical volume manager 116, either singly or in combination. It is further noted that the conditions and criteria in method 300 may be included in the write caching policy, including what constitutes a threat and how a threat is detected.

In step 308, the storage environment is monitored. The storage environment may include server 110, SAN Fabric 120 and any other components or subcomponents that affect storage operations. This step may include similar routines as described previously in conjunction with step 216. Step 308 may further include the use of predictive algorithms that model the behavior of various components in the SAN. Step 308 may further include information that potentially affects the performance of storage file system 114 and logical volume manager 116. In one embodiment, step 308 includes monitoring for network activity that may affect storage operations. In various embodiments, monitoring step 308 may include monitoring events on server 110.

In step 310, a determination is made whether a violation of the write caching policy indicative of a threat to the system exists. That is, do certain events or behaviors indicate a potential undesirable future state of the system? If the determination in step 310 is YES, then in optional step 312, the threat level is evaluated. The threat level may include information about the seriousness of the threat (i.e., potential scope or impact), but also about the degree of certainty or the time frame of the thread (i.e., is the threat imminent or just likely to occur). Based on the results of step 312, preventative action is taken in step 314. It is noted that the preventative action in step 314 may be similar to the corrective action described above in step 220. In various embodiments, preventative action may further include extraordinary measures in view of the perceived threat. It is further noted that step 222 may be repeated in the method of FIG. 3 and recorded to the same historical log as described above in method 200.

In step 316, a determination is made if the threat has been eliminated. If so, then the method returns to step 310. If the threat is still present, then the method returns to step 312. In this manner, a preventative action in step 314 that is only partially effective may be repeated or modified. In other examples, a threat need not be entirely removed, but merely mitigated until no further action is indicated. It is noted that threats to the system may be posed by external entities and processes in some configurations, such that no preventative action may be possible to remove the threat, other than to wait for the threat to expire. In various embodiments, the preventative action may involve preserving an operational condition of the storage environment (e.g., assuring the continued operation of a storage array at some lowered performance level), rather than eliminating the specific threat that was detected.

In one illustrative example of the method of FIG. 3, an operating system installed on server 110 seeks to regain memory that was allocated to a server cache of storage file system 114. In this situation, the monitoring in step 308 recognizes that immediately relinquishing the server cache memory would cause catastrophic overloading of a storage array 130. This is then indicated as a threat to the system in step 310. In step 312, the threat level is determined to be severe and imminent. In step 314, the preventative action involves relinquishing the requested memory in smaller segments over a period of time, which would allow the downstream storage processes to react without overloading, while satisfying the requirements of the operating system. It is noted that this illustrative example has been simplified for clarity, and that the methods described herein are operable for embodiments of much greater complexity and scope.

Figure 4:
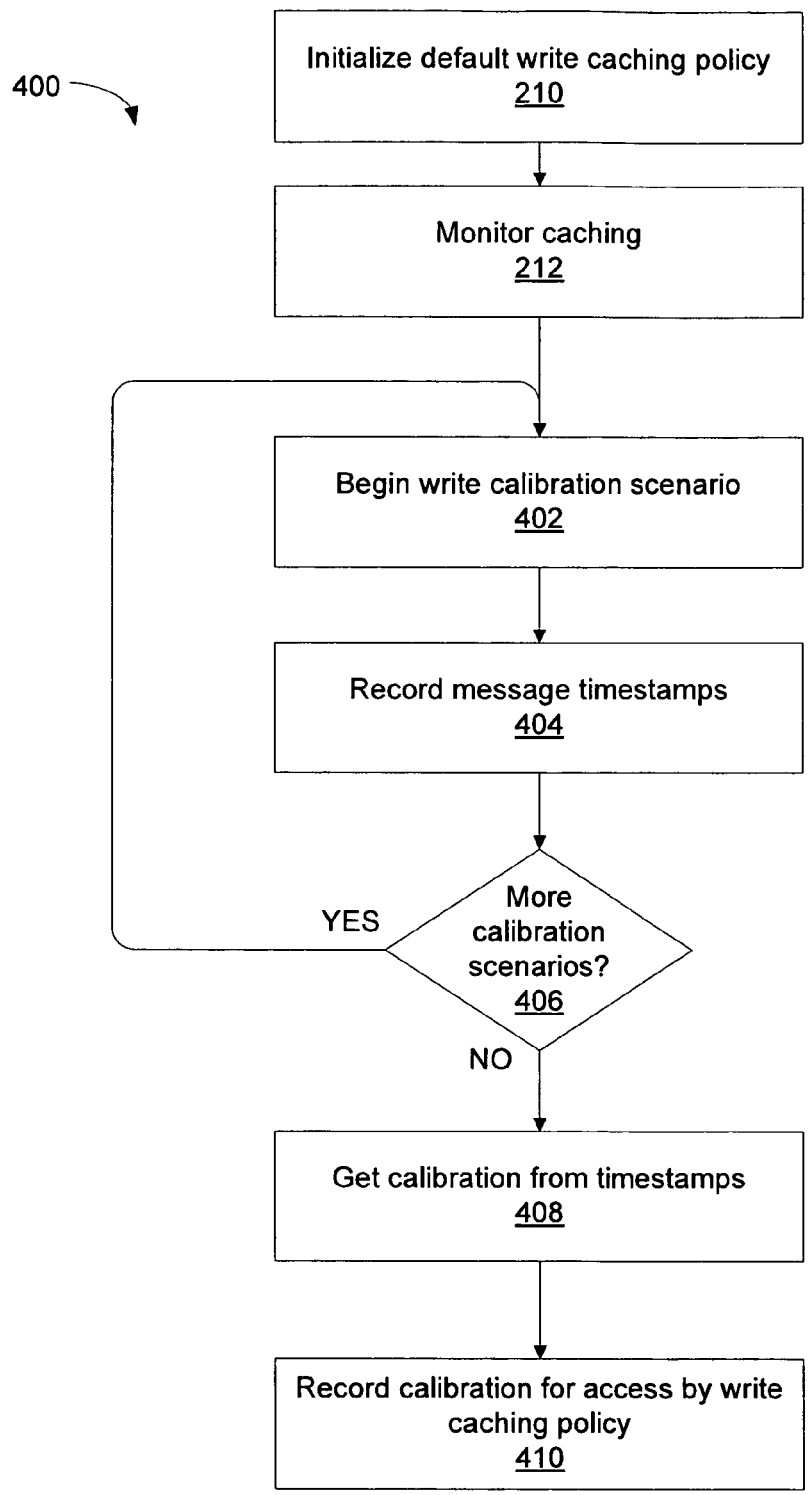
FIG. 4 is a flowchart illustrating one embodiment of a method for calibrating timestamps.

In FIG. 4, a method for obtaining calibration values in one embodiment is illustrated in flowchart form. It is noted that functionality that corresponds to that of FIG. 2 is numbered identically. The calibration values represent a quantitative characterization of a specific enterprise storage system, in particular the dynamic response to messages and inquiries. Characterizing and calibrating the dynamic response can be used to increase the effectiveness of the control loop algorithm described above. For example, the latency between measuring a WPQ value and receiving a WPQ at server 110 may be some finite time value, and may vary according to some distribution. If this measurement latency is known, it could be factored into the write caching policy as a given constant for the control loop. The results of the calibration, which contain information about the enterprise storage system, are referred to as the calibration values and may be periodically refreshed by performing the method of FIG. 4.

In step 402, a calibration write scenario is initiated. A calibration write scenario performs a reference set of write operations for characterizing the messaging performance of the SAN. Since the methods described herein involve messaging between server 110 and storage array 130, a calibration of messaging latency provides an important quantity for regulating the performance of a given SAN. A scenario may involve certain actions or require external approval or authorization to commence. In step 402, the scope and duration of the scenario may also be determined. For example, a calibration of write operations sent only to a specific storage array 130B may be performed. In one embodiment, an administrator may select one or more pre-stored calibration scenarios to perform in step 402. In one embodiment, reference write operations are sent to the SAN during a calibration scenario. The reference write operations represent a known loading of the SAN, which permits the calibration values to be normalized accordingly.

In step 404, the timestamps of messages associated with the calibration scenario are recorded. In this context, a message may refer to any command, operation, inquiry, query, trigger or other function associated with the enterprise storage system. The message may involve logical or physical signals, and may be transmitted in hardware or in software. The message may be timestamped by the sending or receiving party, or by both. In various embodiments, the timestamp may be included with the message, or may be obtained separately from an independent source. In one embodiment, the collection of timestamps may require the installation of additional instrumentation to perform time measurement. The timestamps may be recorded in a file or database, or be held in volatile memory until further calibration values are calculated, in various embodiments.

In step 406, a determination is made if further calibration scenarios are to be executed. A given calibration scenario may involve a certain type of loading or operational profile on the enterprise storage system. If the determination in step 406 is YES, then the method loops to step 402. Otherwise, in step 408 calibration values are obtained from the collected timestamps. In step 408, a computation may be performed on timestamp values for normalizing them or statistically reducing them to relevant, manageable calibration values. The calibration values may further be indexed to the calibration scenario or particular message to which they pertain.

In step 410, the calibration values are stored for access by the write caching policy. In one embodiment, the calibration values are an integral component of the write caching policy. In another case, they are made available to the write caching policy as desired. In various embodiments, the calibration values may replace or append previously recorded values.

Figure 5:
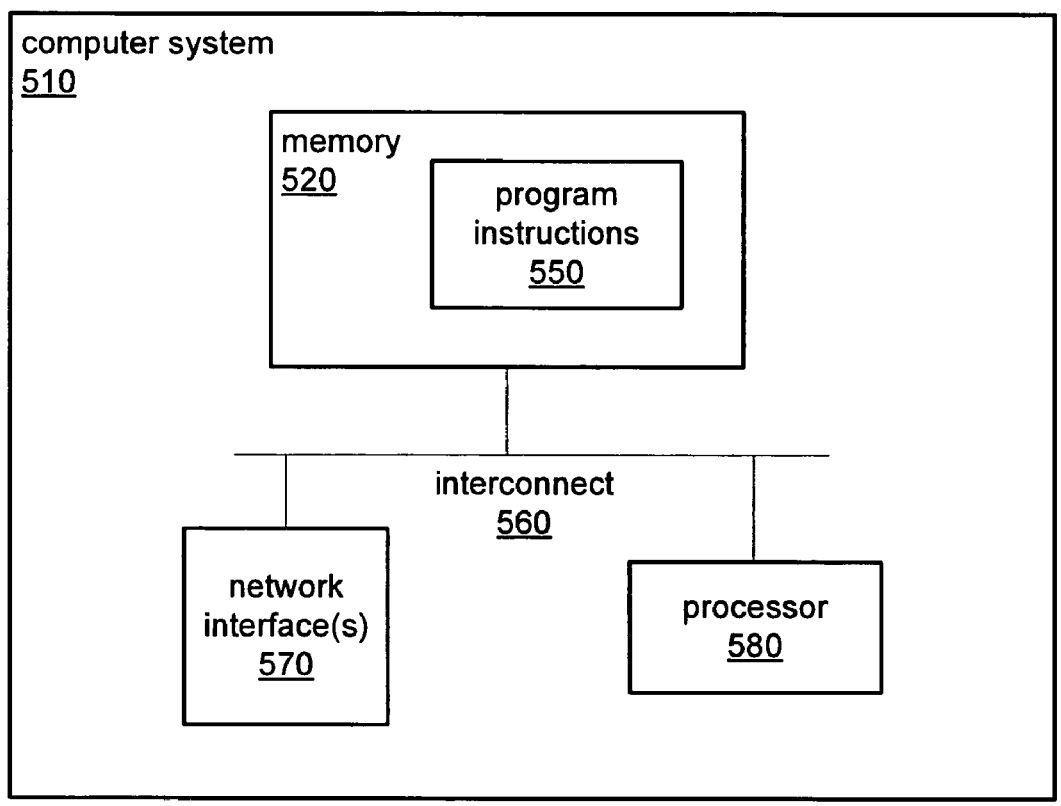
FIG. 5 is a block diagram illustrating a computer system capable of implementing control of write caching, according to one embodiment.

FIG. 5 illustrates a computing system capable of controlling write operations sent to storage arrays as described herein and according to various embodiments. Computer system 510 may be any of various types of devices, including, but not limited to, a personal computer system, desktop computer, laptop or notebook computer, mainframe computer system, handheld computer, workstation, network computer, a consumer device such as a mobile phone, pager, or any type of networkable peripheral device such as storage devices, switches, modems, routers, etc, or in general any type of networkable computing device. Computer system 510 may include at least one processor 580. Processor 580 may couple across interconnect 560 to memory 520 and I/O interfaces 570. I/O interfaces 570 may be any of various types of interfaces configured to couple with and communicate with other devices, according to various embodiments. In one embodiment I/O interfaces 570 may represent a network interface configured to couple with the SAN 120 illustrated in FIG. 1, described above.

Memory 520 is representative of various types of possible memory media, also referred to as "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

In some embodiments, memory 520 may include program instructions 550 configured to implement controlling write operations sent to storage arrays, as described above. In certain embodiments, computer system 510 may represent server 110, while program instructions 550 may be configured to implement an application 112, executing on an operating system running on server 110. In other embodiments, program instructions may be configured to implement a storage file system 114, or a logical volume manager 116, both as described above. In yet other embodiments, program instructions 550 may be configured to implement the methods described in FIGS. 2-4, also described above.

If is further noted that in some embodiments, at least some of the methods described herein may be implemented by the one or more host controllers associated with the storage arrays 130. In one embodiment, each storage array 130 is associated with its own host controller. In such an embodiment, each host controller receives information regarding its respective persistent cache 140. One host controller is configured as a master controller. The other host controller in this embodiment are configured to forward the received information to the master controller. The master evaluates the received information according to the write caching policy, and sends a command to server 110 to alter one or more parameters in the server cache. Other embodiments in which received information is evaluated within the SAN are apparent. For example, the write caching policy may be implemented in a separate module in the SAN, for example a host-based controller that is separate from storage arrays 130. In some instances, the write caching policy may be defined on server 110, and then transmitted to a host controller. In other embodiments, server 110 and a host controller may remain in constant communication regarding violations of the write caching policy, which remains resident on the host controller in the storage array 130.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
    a computer system receiving a plurality of write operations directed to a storage area network (SAN) via a system cache implemented in a memory of the computer system, wherein the write operations are issued by an application running on the computer system, wherein the computer system is coupled to the SAN via a network interface, and wherein the SAN comprises a plurality of persistent caches;
    the computer system causing the plurality of write operations to be sent from the system cache to the SAN;
    the computer system receiving information from the SAN that indicates amounts of available memory within at least first and second ones of the plurality of persistent caches, wherein the at least first and second persistent caches are in different physical devices; and
    in response to determining that the received information is indicative of a violation of a write caching policy, the computer system changing one or more latency parameters of the system cache to decrease a rate at which first and second sets of one or more write operations are provided from the computer system to the SAN, wherein the first set of write operations includes one or more target addresses corresponding to the first persistent cache, and wherein the second set of write operations includes one or more target addresses corresponding to the second persistent cache.

2. The method of claim 1, wherein the violation is based on a current state of the computer system.

3. The method of claim 1, wherein the computer system includes a plurality of computer servers.

4. The method of claim 1, further comprising the computer system sending a plurality of polling messages to the first and second persistent caches, wherein said receiving information from the SAN is in response to sending the plurality of polling messages.

5. The method of claim 4, wherein a first one of the plurality of polling messages destined for the first persistent cache is specific to a first type of storage device, and wherein a second one of the plurality of polling messages destined for the second persistent cache is specific to a second type of storage device.

6. The method of claim 1, wherein the violation of the write caching policy is indicative of a seizure in the SAN.

7. The method of claim 1, wherein the information received from the SAN includes one or more of the following:
    information regarding a current status of write operations pending in at least one of the first or second persistent caches; and
    historical information regarding past write operations to at least one of the first or second persistent caches.

8. The method of claim 1, further including:
    the computer system causing an amount of memory allocated to the system cache to be changed.

9. The method of claim 1, further including:
    the computer system assessing a degree of certainty of the violation, wherein the violation is based on a potential future state.

10. A non-transitory computer readable medium including program instructions that are executable by a computer system to cause the computer system to:
    receive a plurality of write operations directed to a storage area network (SAN) via a system cache implemented in a memory of the computer system, wherein the write operations are issued by an application running on the computer system, wherein the computer system is coupled to the SAN via a network connection, and wherein the SAN comprises the plurality of persistent caches, each of which is configured to buffer write operations destined for a corresponding one of a plurality of storage arrays;
    the computer system causing the plurality of write operations to be sent to the at least first and second persistent caches;
    receive information from the SAN via the network connection that indicates amounts of available memory within at least the first and second ones of the plurality of persistent caches, wherein the at least first and second persistent caches are in different physical devices; and
    in response to determining the received information from the SAN is indicative of a violation of a write caching policy, change one or more latency parameters of the system cache to decrease a rate at which first and second sets of one or more write operations are provided from the computer system to the SAN, wherein the first set of write operations includes one or more target addresses corresponding to the first persistent cache, and wherein the second set of write operations includes one or more target addresses corresponding to the second persistent cache.

11. The computer readable medium of claim 10, wherein the program instructions are executable to cause the computer system to adjust a first latency parameter and a second latency parameter in response to the received information, wherein the first latency parameter corresponds to a first managed volume configured to receive write operations from the first persistent cache and wherein the second latency parameter corresponds to a second managed volume configured to receive write operations from the second persistent cache.

12. The computer readable medium of claim 10, wherein the program instructions are executable to further cause the computer system to:
change the write caching policy in response to the violation of the write caching policy.

13. The computer readable medium of claim 10, wherein the program instructions are executable to further cause the computer system to allocate additional memory to the system cache for buffering write operations.

14. The computer readable medium of claim 10, wherein the write caching policy is configured according to storage requirements of the application.

15. A computer system, comprising:
a system cache;
a processor; and
a memory having stored therein program instructions executable to cause the computer system to:
execute an application configured to issue write operations to a storage area network (SAN), wherein the write operations issued by the application are forwarded to the SAN by an operating system of the computer system via the system cache, wherein the SAN comprises a plurality of persistent caches, each of which is configured to buffer write operations destined for a corresponding one of a plurality of storage arrays;
cause the issued write operations to be forwarded from the system cache to the SAN;
receive write operation information from the SAN, wherein the write operation information includes information specifying amounts of available memory within at least first and second ones of the plurality of persistent caches, wherein the first and second persistent caches are in different physical devices; and
in response to a determination that the received write operation information is indicative of a violation of a write caching policy, change one or more latency parameters of the system cache to decrease a rate at which first and second sets of one or more write operations are provided from the computer system to the SAN, wherein the first set of write operations includes one or more target addresses corresponding to the first persistent cache, and wherein the second set of write operations includes one or more target addresses corresponding to the second persistent cache.

16. The system of claim 15, wherein the violation is indicative of a future state of the SAN.

17. The system of claim 15, wherein determining that the received write operation information is indicative of a violation includes determining whether one or more rules of the write caching policy are violated, wherein determining whether one or more rules are violated is based at least in part on a plurality of parameters affecting the operation of the system cache.

18. The system of claim 17, wherein the memory further includes program instructions executable by the processor to cause the computer system to change the write caching policy based at least in part on altered values for one or more of the plurality of parameters.

* * * * *